F. L. CROSS.
GAS REGULATOR FOR MIXING CHAMBERS.
APPLICATION FILED JUNE 20, 1910.

1,092,204.

Patented Apr. 7, 1914.
2 SHEETS—SHEET 1.

Witnesses
C. M. Shannon.
A. M. Dorr.

Inventor
FRANK L. CROSS

By
Attorneys

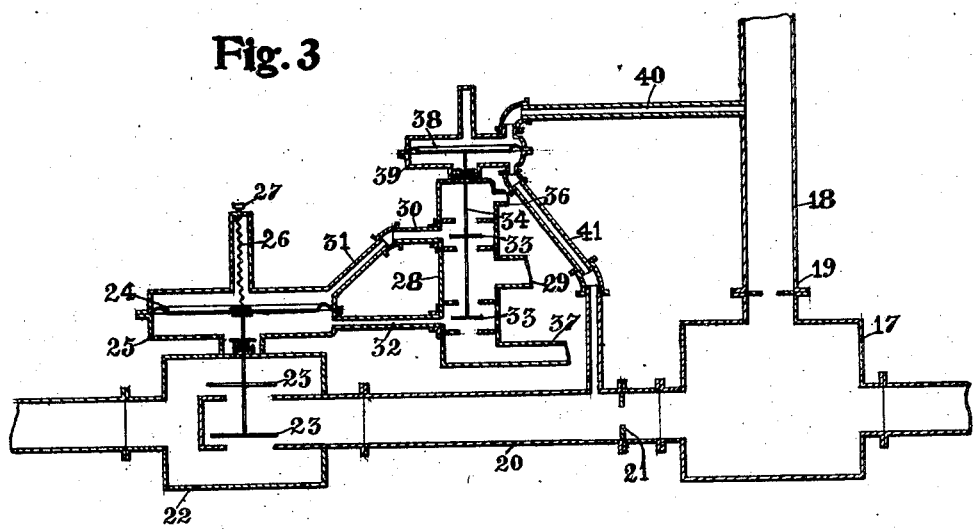
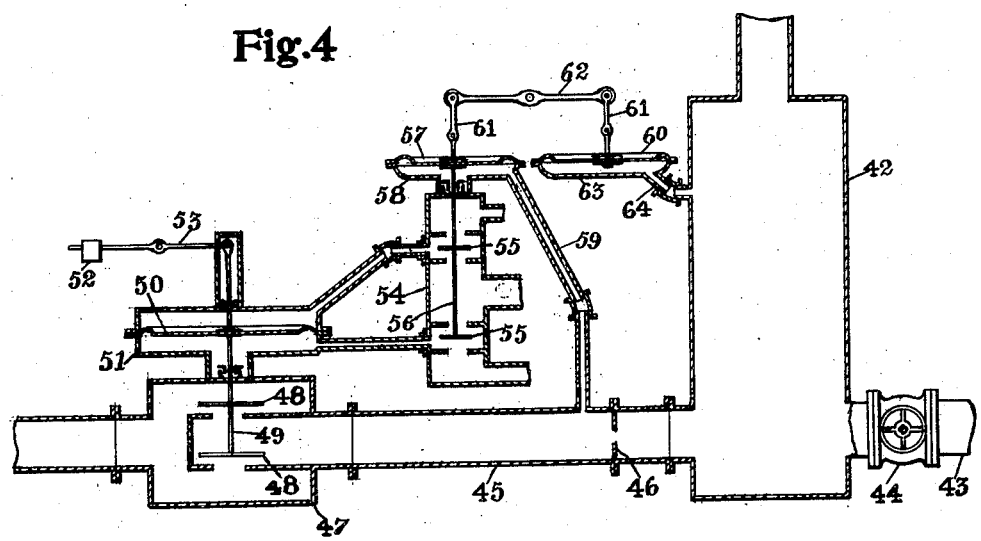

UNITED STATES PATENT OFFICE.

FRANK L. CROSS, OF MADISON, WISCONSIN.

GAS-REGULATOR FOR MIXING-CHAMBERS.

1,092,204.  Specification of Letters Patent.  Patented Apr. 7, 1914.

Application filed June 20, 1910. Serial No. 567,840.

*To all whom it may concern:*

Be it known that I, FRANK L. CROSS, a citizen of the United States of America, residing at Madison, in the county of Dane and State of Wisconsin, have invented certain new and useful Improvements in Gas-Regulators for Mixing-Chambers, of which the following is a specification, reference being had therein to the accompanying drawings.

In a gas generating and distributing apparatus it is frequently desirable to introduce currents of gas or air from two independent sources of supply to a mixing chamber or main and to govern their relative rates of flow so that a constant rotio is maintained between them, regardless of any changes or variations in one of them which may be brought about, by conditions due to the use to which the apparatus is put, or by regulation of one of the currents by the operator.

This invention relates to means for automatically regulating flow of gas or air into a chamber or the like from two independent sources in such a manner that the flow through the conduit supplying one column of gas varies automatically in response to changes in the flow through the other conduit whereby a constant ratio of flow is maintained between the two incoming currents.

The invention consists in the matters hereinafter set forth, and more particularly pointed out in the appended claims.

Figure 1:
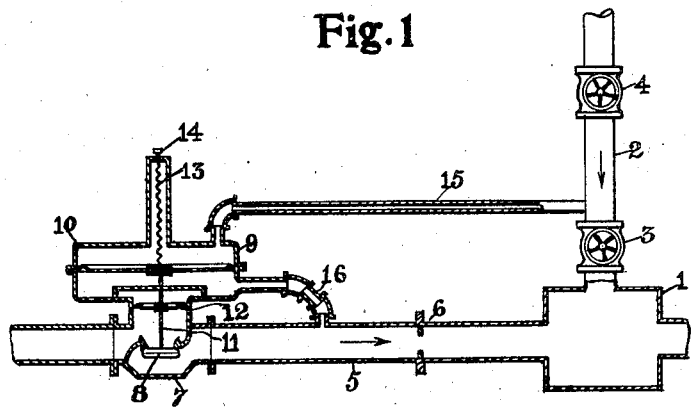
Figure 2:
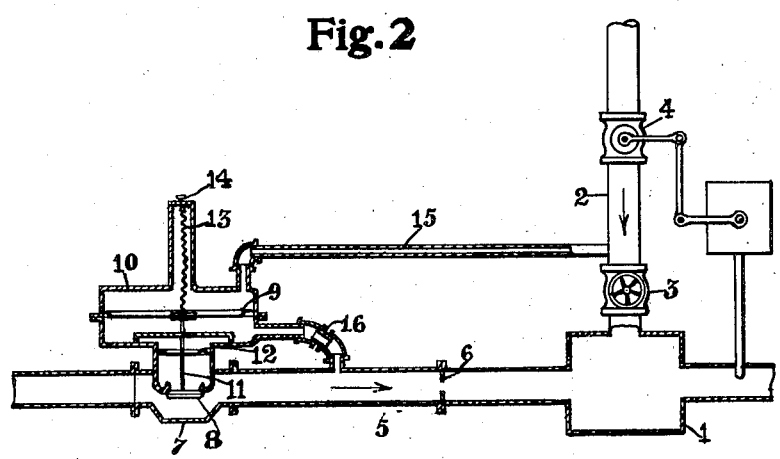

In the drawings, Figure 1 is a longitudinal sectional view largely diagrammatic of an apparatus that embodies features of the invention; Fig. 2 is a longitudinal sectional view of the apparatus as adapted for use with a thermostatic regulator or the like; Fig. 3 is a longitudinal sectional view, largely diagrammatic, of a modification of the apparatus; and Fig. 4 is a longitudinal sectional view of a modification showing another means of maintaining a constant ratio in the flow of gas or air from two sources of supply.

Referring to the drawings, a mixing chamber 1 is supplied with gas from a convenient source by a conduit 2 which has a variable and adjustable restriction or ajutage near its inlet to the chamber that is preferably in the form of a permanent adjustment cock 3. The flow into the conduit 2 is controlled by a cock 4 which as indicated in Fig. 1 may be operated manually, or, as shown in Fig. 2, may be a fluid pressure governed valve operated as by a thermostat or the like. The gas or air from this source may be termed "primary" and the conduit the "primary conduit" for the purpose. Gas or air from a second source of supply is discharged into the chamber 1 through a conduit 5 with a restriction or ajutage 6 near its mouth. This, for sake of clearness, is hereinafter referred to as the "secondary" gas or air and its conduit as the "secondary conduit". It is evident that under the law of flow of liquids through orifices the rates of discharge from the conduits 2 and 5 are each dependent upon the size of the openings of the respective restrictions at 3 and 6 and upon the heads under which the fluids pass the restrictions. Accordingly, by adjusting the openings of the two restrictions to a certain ratio and maintaining likewise a constant ratio between the inlet pressures in the conduits the relative volume of flow through the conduits into the chamber may be gaged and regulated accurately and thereby any desired ratio between the volumes delivered may be maintained in the chamber.

Accordingly a regulating valve 7 that is adapted to be operated by fluid pressures is introduced in the secondary conduit on the high pressure side of the restriction 6. In preferred form, the valve has an apertured seat provided with a closure 8 that is shifted by a diaphragm 9 in a pressure drum 10 through the medium of a connecting stem 11. An auxiliary diaphragm 12 likewise connected to the stem 11, serves to balance the closure 8. A spring 13 counterbalances in part the weight of the diaphragm and stem and its tension may be regulated by a suitable adjusting screw 14. The upper chamber of the drum 10 is connected by a pipe 15 with the primary conduit 2. A pipe 16 from the lower chamber of the drum opens into the conduit 5 on the high pressure side of the ajutage 6.

In operation the regulating valve closure 8 tends to move away from its seat when the pressure in the main 2 increases beyond that in the main 5. This increases the pressure in the latter main correspondingly. When the pressure decreases in the primary main, the regulating valve closes. Obviously the spring 13 and the apertures of the restrictions 3 and 6 may be so disposed and arranged that any required difference in pressure between the two mains may be maintained in this manner. The pressure in the conduit 2 or the flow therethrough is subject to the manipulation of the control cock 4, or if the latter be set and left stationary variations in the inlet pressure of gas entering the conduit 5 are taken care of by the regulating valve so that a constant head is maintained on the pressure side of the ajutage 6.

The apparatus is also a volume regulator that determines the amount of gas supply as a whole to the mixing chamber 1, and if the outgoing gas from the said chamber be ignited as in a furnace or the like the valve 4 may be operated through thermostatic connections indicated diagrammatically as in Fig. 2, to maintain a constant temperature at the point of ignition.

The available pressure in the conduits 2 and 5 may not be sufficient to operate the regulator valve. In such instances the construction shown in Fig. 3 is a convenient apparatus for obtaining the required results. In such arrangement, a mixing chamber 17 has a primary supply conduit 18 discharging into it through an ajutage 19 and a secondary supply main 20 admitting gas through an ajutage 21. A regulating valve indicated at 22 of any preferred type, has its closures 23 operated by a diaphragm 24 of a pressure drum 25, a spring 26 with adjusting screw 27 acting as a counterbalance in part for the closure and operating to hold the valve open. A valve casing 28 has a single inlet 29 connected to any suitable source of air or gas under pressure, an outlet 30 in communication with the upper chamber of the drum 25 through a pipe 31, and a second outlet connected with the lower chamber of the drum by a pipe 32. A pair of closures 33 connected by a stem 34 are arranged to throw the pipe 32 into connection with the supply 29 when they are at the lower end of their throw and the pipe 31 with the supply 29 when they are at the upper end of their throw, waste outlets 36 and 37 allowing the gas from the drum chambers to escape readily when said chambers are not connected with the supply opening.

The closures 33 and stem 34 are shifted by a diaphragm 38 in a pressure drum 39, one chamber of which is connected by a pipe 40 with the conduit 18 on the high pressure side of the ajutage 19 and the other chamber, with the main 20 on the high pressure side of the ajutage 21 through a pipe 41.

Another form of apparatus that is designed to establish a fixed difference in pressure between two conduits discharging into the mixing chamber, is indicated in Fig. 4. In such arrangement a mixing chamber 42 has one conduit 43 discharging through a variable restriction 44, and a secondary conduit 45 discharging into the chamber through an apertured diaphragm 46 or like ajutage. A regulating valve casing 47 in the latter conduit has closures 48 and stem 49 operatively connected to a diaphragm 50 in a pressure drum 51, the whole being counterbalanced or arranged to open or close as the case may be, under the influence of an adjustable weight 52 acting on the stem through a lever 53. Or a counter-balance spring may be used as indicated in the other constructions. Air or gas under pressure is admitted to either side of the diaphragm 50 through a suitable valve 54 whose closures 55 on the stem 56 are connected to a diaphragm 57 that forms one wall of a pressure chamber 58. The latter is in communication with the conduit 45 on the high pressure side of the ajutage 46 through a pipe 59. The diaphragm 57 is connected to work in opposition to a second diaphragm 60 by means of links 61 and a lever 62. A chamber or shell 63 of which the diaphragm 60 forms one wall is in communication through a fitting 64 with the mixing chamber 42. If the weight 52 counterbalances the diaphragm 50 and attached parts and the diaphragms 57 and 60 are of equal size, equal pressures in the conduit 45 and mixing chamber are maintained by the apparatus. If however, one of the diaphragms is smaller than the other as herein indicated, differences in pressure corresponding to the difference in the size of the diaphragms is set up in the conduit and mixing chamber. By this last form of apparatus both constrictions of the conduits may be of equal size or other arrangement thereof may be used, the relative areas of the controlling diaphragms determining the differences in pressure between the conduit and chamber. The chamber, of course, may be a conduit, main or the like.

It follows that by the use of this apparatus, the inlet pressures of two independent columns may be varied in unison without manipulation of the apparatus and without inspection or supervision of the working parts to correspond to variations in pressure occasioned in one of them.

Obviously, changes in details of construction may be made without departing from the spirit of the invention and I do not care to limit myself to any particular form or arrangement of parts.

What I claim as my invention is:—

1. In gas apparatus, a chamber having two inlets and an outlet, a primary conduit in communication with one inlet, a secondary conduit in communication with the other inlet, fluid pressure operated means regulating the flow through the secondary conduit, and means controlled by the inlet pressure in the primary conduit and adapted to admit operating fluid to the flow regulating means of the secondary conduit to tend to lessen the resistance to the flow through the secondary conduit when the pressure in the primary conduit rises and to restrict said flow when said pressure falls.

2. In gas apparatus, a chamber having two inlets and an outlet, a primary conduit in communication with one inlet, a secondary conduit in communication with the other inlet, means for regulating the flow through the secondary conduit adapted to be operated by fluid under pressure, and means controlled by the inlet pressure in the primary conduit and adapted to admit operating fluid to the regulating means, the latter being adapted to tend to lessen the resistance to the flow through the secondary conduit when the pressure in the primary conduit rises and to increase the resistance to the flow when the said pressure fails.

3. In gas apparatus, a chamber having two inlet and an outlet, a primary conduit in communication with one inlet, a secondary conduit in communication with the other inlet, a fluid pressure operated valve regulating the flow through the secondary conduit, and mechanism controlled by the inlet pressure of fluid in the primary conduit and adapted to admit operating fluid to the said valve to tend to open said valve when the inlet pressure in the primary conduit increases and to close it when the said pressure falls.

In testimony whereof I affix my signature in presence of two witnesses.

FRANK L. CROSS.

Witnesses:
A. REGAN,
JNO. ST. JOHN.